United States Patent Office.

WILLIAM D. SUNDERLIN, OF GREEN ISLAND, NEW YORK.

INSECTICIDE.

SPECIFICATION forming part of Letters Patent No. 469,285, dated February 23, 1892.

Application filed February 25, 1890. Serial No. 341,696. (No specimens.)

*To all whom it may concern:*

Be it known that I, WILLIAM D. SUNDERLIN, a citizen of the United States, residing at Green Island, in the county of Albany and State of New York, have invented a new and useful article of manufacture for use as an insecticide, of which the following is a specification.

I have discovered that the precipitated solid product from the mixture of soda-ash (or black ash) and caustic lime (or unslaked lime) which have been boiled in water, as practiced for making caustic-soda solutions, possesses virtues and properties which constitute it an effective insecticide and an excellent fertilizer when the said precipitated product is reduced to a finely-powdered condition and will tenaciously adhere to the foliage, blossoms, and fruits of plants, shrubs, and trees, and when applied to the same by dusting or sprinkling it operates effectually to destroy nearly, if not quite, all kinds of insects, worms, and vermin which infest the same, and also when deposited in a finely-powdered condition in small quantities in the soil with seeds it operates not only as a fertilizer, but as a destroyer of wire-worms, grubs, and other worms which feed on and destroy the sprouts and rootlets of the sprouting seeds. I have made available for practical use and application these newly-discovered virtues and properties of the said substance or precipitated solid product, which is known to the trade as "lime-mud." This I have done by reducing the said lime-mud to a finely-powdered or dust-like condition, which renders it suitable to be readily and uniformly applied in small quantities by sprinkling or dusting the same on the foliage or blossoms of plants, vines, shrubs, and trees which may be infested with insects, worms, or vermin, which are injurious to the same, or by spraying an emulsion of this substance on such plants or on the foliage and blossoms of the same, and also suitable for easy and uniform deposit in small quantities with seeds into the soil by hand of an operator or by means of a seed-planter or other suitable machine without injury to the seeds deposited, though in contact, more or less, with such seed, so as to be directly available for destroying worms and grubs, which may seek to feed on the tender sprouts and rootlets in their early state of growth, when liable to be cut or eaten by such worms or grubs. This lime mud, or precipitated solid product from the cooked or boiled mixture of soda-ash, (or black ash,) unslaked lime, and water, can generally be obtained from works making caustic-soda liquor preparatory to making caustic soda of commerce, and also for use for making chemical fiber from vegetable substances. This caustic-soda liquor may be produced by means as follows: Take soda-ash of commerce of, say, about forty-eight (48) per cent. strength and unslaked lime in proportion of about one hundred (100) pounds of the former to from forty (40) to sixty (60) pounds of the latter, according to its strength or purity, and dissolve the same in a suitable quantity of water, and while stirring this mixture continually boil the same from one to three hours or more, after which boiling this solution is allowed to settle, when the undissolved matters which constitute this lime-mud will be precipitated, while the caustic-soda liquor will stand as clear liquor above the same and may be drawn off for storage or for use, when the precipitated solid matters or lime-mud may be readily removed from the mixing-vessel by shovels or other suitable means to any selected place of deposit for treatment to giving to this lime-mud the necessary condition for rendering available its newly-discovered virtues and properties for destroying insects, worms, and vermin infesting plants and fertilizing-soils. The necessary condition of this material under which these virtues and properties therein contained may be made available for practical use as an effective insecticide and fertilizer is that of so fine a subdivision of the particles of this lime-mud as to give it a fine powder or dust-like form, whereby a small quantity may be made to uniformly cover, as a light or thin film or dust deposit, a comparatively large area of surface and be applied by dusting, sprinkling, or spraying the surfaces of the leaves and blossoms without breaking or in the least injuring the delicate textures, fuzz, or down on the same. The reduction of this lime-mud to the said fine powder or dust-like condition may be effected by any known means whereby the water will first be expelled from the solid matters of this substance and the dried solid matters be broken or crushed and reduced to a fine powder or flour-like form. This expelling of the water for drying the said substance can be effected by means of any suitable drying apparatus, while the reduction of the dried product to the powder or flour-like condition can be effected by means of ball-mills, stones, or rollers, as may be preferred. When reduced to a suitable degree of fineness, this product is in condition for use and may be put up into packages, as bags or barrels, for convenience of handling, transportation, storage, and sale, and be kept in store without deterioration or change of condition until used.

This insecticide is to be applied to the foliage and blossoms of plants about or at the time the insects, worms, or vermin begin to appear on the same by dusting it from a suitable bag or by ejecting it by an air-blast on the foliage and blossoms or by sprinkling it by hand on the same when the plants are low; but for convenient application to the foliage and blossoms of trees and grape-vines this insecticide may be applied in the form of an emulsion when mixed with water and be sprayed on the same by means of a suitable syringe or force-pump.

When it is to be used for destroying wire-worms, grubs, or other worms which live in the soil and feed on the young sprouts and rootlets of plants grown from seeds, this insecticide is introduced with the seed when being planted or sown into the soil, and this may be done by hand or by means of a seed planter or sower arranged with means for depositing with seed, gypsum, and fertilizer, &c., as is the practice in many cases, so that this substance will be in contact with or in close neighborhood to the seed.

When this article is to be used as a fertilizer, it may be applied to the soil with the seen when being planted, and also at the base of the stalks or sprouts of plants or be sown broadcast on grass growing on lands which need lime in the soil.

Besides possessing properties for destroying insect and vermin infesting plants, this material, when applied to such plants in a powder or dust-like form, as above described, possesses the advantageous property of tenacious adhesion to both the upper and lower surfaces of the foliage and blossoms, so that winds and dews will not easily remove the same, which property I believe is new in insecticides and obviates the use of the flour of rye or other grain or other substances now generally required to be mixed with paris-green, london-purple, and other insecticides for holding them on the surfaces applied to.

Another new feature in this article as an insecticide is that while it is destructive to insects, worms, and vermin of plants generally it is harmless to animals, and instead of injuring plants it contributes to a healthy growth of the same.

In some cases there may be mixed with this new insecticide paris-green or london-purple or other well-known poisonous substances heretofore used as insecticides, so that when plants or foliage are infested at the same time with two or more kinds of plant-pests such a mixture will produce an insecticide of dual character or virtue, which may be advantageous in many cases, while at the same time this new insecticide may be made to operate as an agent to tenaciously hold those old kinds of insecticides with the plants and also contribute to the growth of the same.

What I claim as my invention is—

The herein-described insecticide, consisting of the dried and pulverized precipitate from the liquor employed in making caustic-soda solutions and known as "lime-mud," as set forth.

WILLIAM D. SUNDERLIN.

Witnesses:
CHARLES SELKIRK,
A. SELKIRK, Jr.